(12) United States Patent
Asghari et al.

(10) Patent No.: US 9,450,417 B2
(45) Date of Patent: Sep. 20, 2016

(54) METHOD FOR EFFICIENCY-DRIVEN OPERATION OF DISPATCHABLE SOURCES AND STORAGE UNITS IN ENERGY SYSTEMS

(71) Applicant: NEC Laboratories America, Inc., Princeton, NJ (US)

(72) Inventors: Babak Asghari, San Jose, CA (US); Ratnesh K. Sharma, Fremont, CA (US); Ali Hooshmand, Campbell, CA (US)

(73) Assignee: NEC Corporation (JP)

( * ) Notice: Subject to any disclaimer, the term of this patent is extended or adjusted under 35 U.S.C. 154(b) by 416 days.

(21) Appl. No.: 14/093,511

(22) Filed: Dec. 1, 2013

(65) Prior Publication Data

US 2014/0180489 A1    Jun. 26, 2014

Related U.S. Application Data

(63) Continuation-in-part of application No. 13/858,031, filed on Apr. 6, 2013, now Pat. No. 9,098,817.

(60) Provisional application No. 61/731,967, filed on Nov. 30, 2012.

(51) Int. Cl.
   H02J 3/14        (2006.01)
   H02J 3/46        (2006.01)
   G06Q 10/06       (2012.01)
   G06Q 50/06       (2012.01)
   H02J 3/32        (2006.01)

(52) U.S. Cl.
   CPC ........... *H02J 3/46* (2013.01); *G06Q 10/06315* (2013.01); *G06Q 50/06* (2013.01); *H02J 3/32* (2013.01); *H02J 2003/146* (2013.01)

(58) Field of Classification Search
   CPC combination set(s) only.
   See application file for complete search history.

(56) References Cited

U.S. PATENT DOCUMENTS 8,930,035 B2 *   1/2015   Marroyo Palomo .. G06Q 50/06
                                                700/287

* cited by examiner

*Primary Examiner* — Carlos Ortiz Rodriguez
(74) *Attorney, Agent, or Firm* — Joseph Kolodka (57) ABSTRACT

The invention is directed to a method or management system which 1) dispatches high efficiency generators first, 2) charges/discharges energy storage units in a way to enhance efficiency of generators in the system or avoid the necessity of dispatching generators during their low efficiency operations at all. In this way the method or management system utilizes its knowledge about the efficiency characteristics of generators in the system and its ability to change the net demand seen by the generators through charge and discharge of energy storage units to increase the overall efficiency of the energy system.

18 Claims, 7 Drawing Sheets

METHOD FOR EFFICIENCY-DRIVEN OPERATION OF DISPATCHABLE SOURCES AND STORAGE UNITS IN ENERGY SYSTEMS

The present application is a continuation-in-part of application Ser. No. 13/858,031 filed Apr. 6, 2013, entitled "Method for Real-Time Control of Energy Storage Units to Reduce the Electricity Cost", which in claims priority to Provisional Application No. 61/670,411 filed Jul. 11, 2012, and the present application claims priority from Provisional Application No. 61/731,967, filed Nov. 30, 2012, entitled "A Method for Efficiency-Driven Operation of Dispatchable Sources and Storage Units in Energy Systems, the contents of which are incorporated by reference.

BACKGROUND

This application relates efficiency-driven operation of dispatchable sources and storage units in energy systems.

Distributed generation, also called on-site generation, dispersed generation, embedded generation, decentralized generation, decentralized energy or distributed energy, generates electricity from many small energy sources. Most countries generate electricity in large centralized facilities, such as fossil fuel (coal, gas powered), nuclear, large solar power plants or hydropower plants. These plants have excellent economies of scale, but usually transmit electricity long distances and negatively affect the environment. Distributed generation allows collection of energy from many sources and may give lower environmental impacts and improved security of supply.

Right-sized resources such as microgrids are able to offer important but little-known economic advantages over central plants. Smaller units offered greater economies from mass-production than big ones could gain through unit size. Batteries can act as a buffer to alleviate the mismatch of generation and demand in a microgrid. In this way, when DGs output power is more than the demand, battery is charged. The battery is discharged during times of low generation and high demand to reduce the power mismatch.

Due to rapid changes in the power output of renewable energy sources over time and variations in the demand, a battery might experience a very irregular pattern of charge and discharge in a microgrid if not controlled properly. This will have a negative impact on battery lifetime and will increase the overall operational cost of the microgrid. Therefore, in addition to balancing supply and demand in real-time, power management system should operate the battery in a way to minimize operational cost of a microgrid.

Since one goal of controller in energy usage optimization of microgrids is to reduce the cost of consumed energy for the end-users, it is necessary to calculate or obtain the unit price of energy from each generator, energy storage unit, and the grid (in case of grid-tied microgrids) at each step of microgrid operation. In this way the controller can identify the cheapest sources of energy in a microgrid and send commands to them in order to match the electricity supply and demand in the system.

Conventional systems are based on passive control of energy storage units. Examples include peak-shaving control were a storage unit discharges only if the load exceeds a certain threshold. Another example is schedule-based control in which a storage unit charges and discharges at certain times during the day. However, passive control lacks the general knowledge about real-time changes in generation and demand levels as well as operational costs of the system; thus it cannot guarantee an optimal operation of the storage unit.

In energy systems with distributed generations and energy storage units (Distributed energy resources, DERs), the demand at each instant is supplied through a combination of different sources including discharging the energy storage unit. Since each DER unit has a unique efficiency versus input/output characteristic, the overall supply of load in the system might happen at low efficiencies during certain periods of operation. Low efficiency operation increases per unit cost of energy delivered to the load due to the excessive losses in the system. Previous attempts were based on improving the quality of design and materials used in different DER units to increase the efficiency of individual generation resources in the system. Other attempts include sizing the units in a way to ensure high-efficiency operation all the time. Mechanical systems such as gearboxes are also used in conjunction with rotating generators to increase the efficiency of generation in the system.

SUMMARY

In one aspect, a method for managing an efficiency-driven operation of dispatchable generator sources and storage units in energy systems, includes selecting an efficient combination of available energy resources in an energy system to supply a current load level; assessing a storage unit's state of charge of a storage unit, availability for charge or discharge operation and efficiency; sending dispatch commands to generators and keeping the storage unit idle if charging or discharging the storage unit does not increase an overall efficiency of generation in the energy system; calculating charge or discharge of the storage unit and dispatching levels to maximize efficiency of the storage unit if charging or discharging the storage unit increases an overall efficiency of generation in the energy system; and sending dispatch commands to the generators and charge or discharge commands to the storage unit for efficiency-driven operation of dispatchable generators and storage units in the energy system.

In a similar aspect, a management system for an energy system for managing an efficiency-driven operation of dispatchable generator sources and storage units in energy systems, the management system includes a computer system configured for selecting an efficient combination of available energy resources in an energy system to supply a current load level; assessing a storage unit's state of charge of a storage unit, availability for charge or discharge operation and efficiency; sending dispatch commands to generators and keeping the storage unit idle if charging or discharging the storage unit does not increase an overall efficiency of generation in the energy system; calculating charge or discharge of the storage unit and dispatching levels to maximize efficiency of the storage unit if charging or discharging the storage unit increases an overall efficiency of generation in the energy system; and sending dispatch commands to the generators and charge or discharge commands to the storage unit for efficiency-driven operation of dispatchable generators and storage units in the energy system.

DESCRIPTION

The present inventive method is directed to a method entailing a management system which 1) Dispatch high efficiency generators first 2) Charge/discharge energy storage units in a way to enhance efficiency of generators in the system or avoid the necessity of dispatching generators during their low efficiency operations at all. In this way the management system utilizes its knowledge about the efficiency characteristics of generators in the system and its ability to change the net demand seen by the generators through charge and discharge of energy storage units to increase the overall efficiency of the system. The invention works with any combination of dispatchable generations without any need for changes in the infrastructure and devices. This makes the solution less expensive and technology agnostic.

Figure 1:
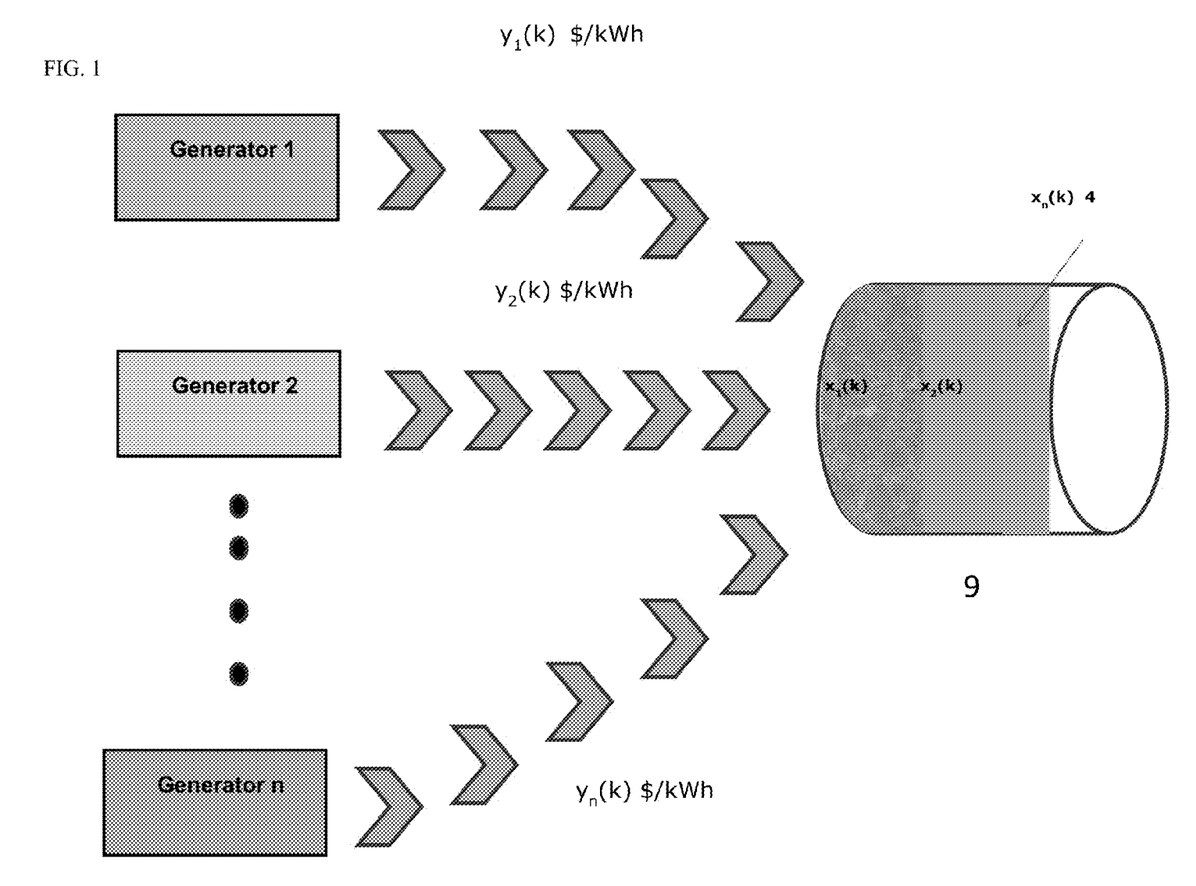
FIG. 1 shows an exemplary energy storage device which is charged by a variety of generators.

FIG. 1 shows an exemplary energy storage device 9 which is charged by a variety of generators 1 . . . n. Energy storage units are different from conventional generators in a sense that they do not have any fuel costs. Therefore, to obtain the unit price of energy for storage units, charging costs should be calculated and converted to a unit energy price as will be described later.

The energy storage device 9 can be a rechargeable battery module. The battery module can be charged at different rates by different generators. The rate for generator(n) can be expressed as $y_n(k)$ $/kWh. The device is charged through a unit price of electricity (UPOE) The UPOE determination at time step k when sources 1 . . . n are charging the battery can be expressed as $$UPOE(k) = \frac{x_1(k) \times y_1(k) + x_2(k) \times y_2(k) + \ldots + x_n(k) \times}{x_1(k) + x_2(k) + \ldots + x_n(k)}$$

where $x_1(k)$ represents the total stored amp-hour in the battery from source 1 at time k. During discharging, $x_1$ to $x_n$ decreases with the same proportion.

Figure 2A:
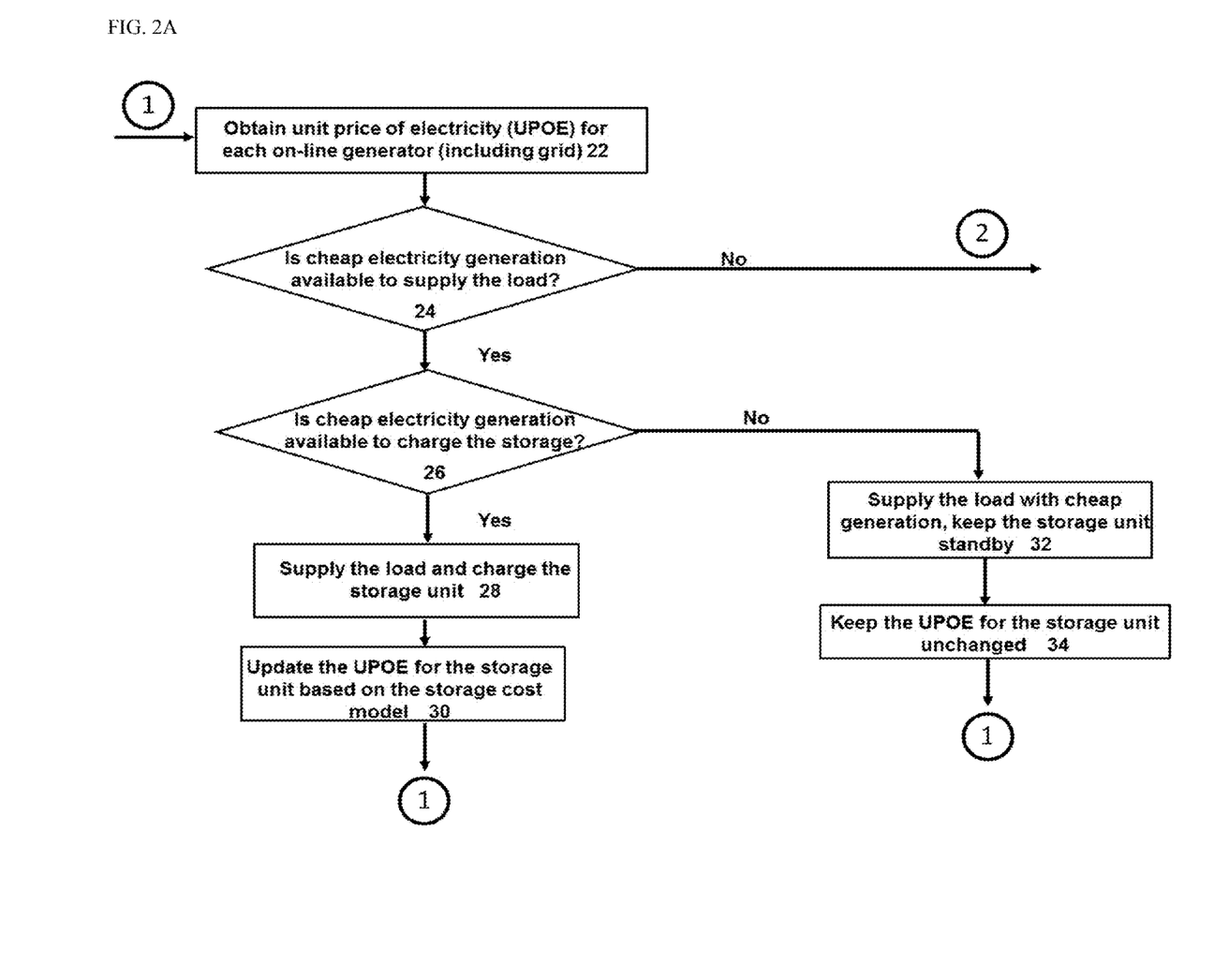
FIGS. 2A-2B show an exemplary process for supplying a load and charging the energy device of FIG. 1.

FIG. 2A shows an exemplary process for supplying a load and charging the energy device of FIG. 1. First, the process obtains a unit price of electricity (UPOE) for each online generator, including grid UPOE (22). Next, the process checks if inexpensive electricity is available to supply the load (24). If not, the process jumps to 40 (FIG. 2B0 through connector 2 and otherwise the process proceeds to 26 where it checks if cheap electricity generation is available to charge the energy storage unit. If so, the process supplies the load and charges the storage unit (28) and then updates the UPOE for the storage unit based on the storage cost model (30) and loops back to 22 through connector 1. From 26, if there is insufficient cheap electricity to charge the storage unit, the process supplies the load with cheap electricity while keeping the storage unit on standby (32). The process keeps the UPOE for the storage unit unchanged (34) and loops back to 22 via connector 1.

Figure 2B:
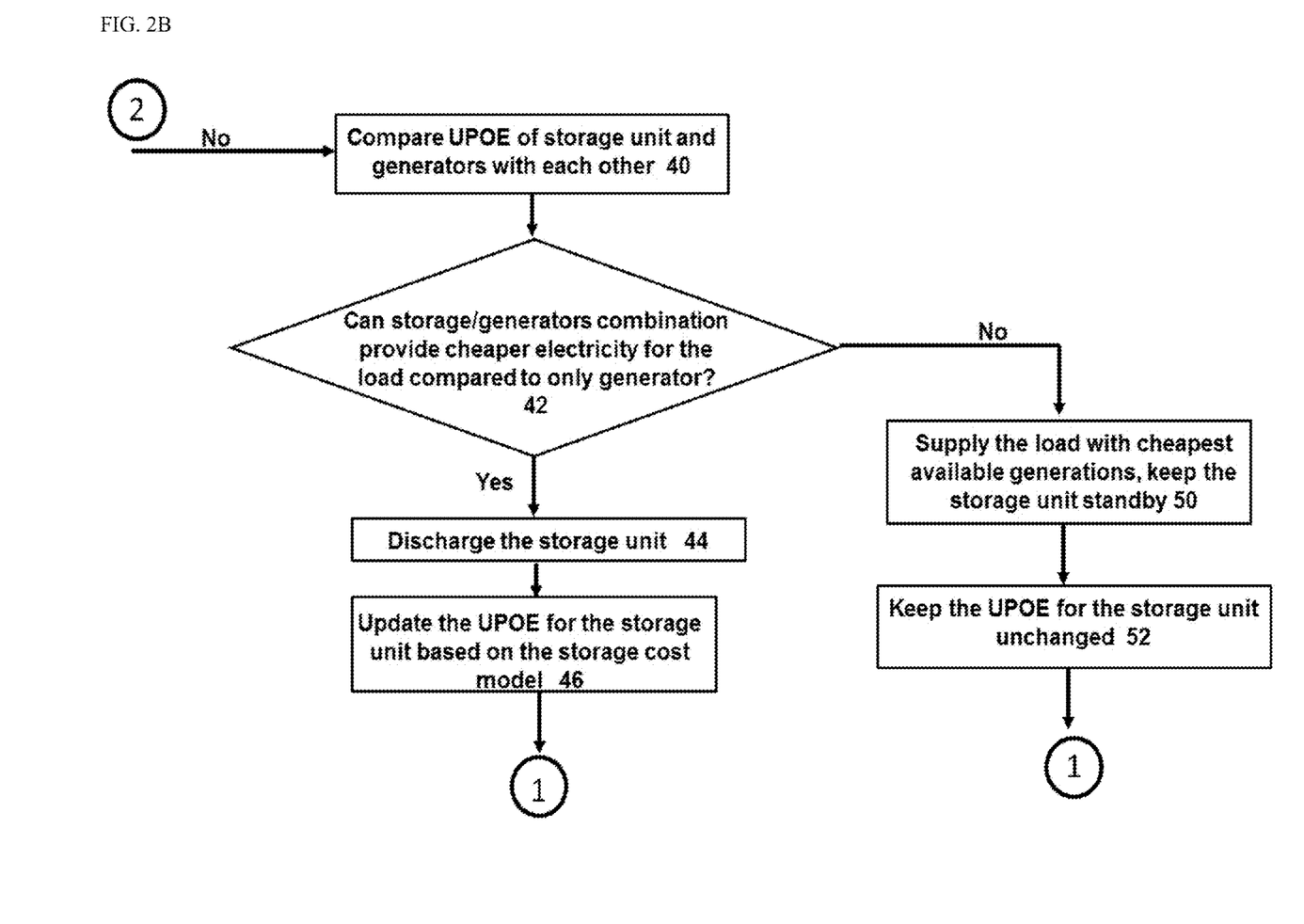

FIG. 2B is a continuation of FIG. 2A, and the process compares the UPOE of the storage unit and generators with each other (40). The process then checks if the storage unit and the generators in combination can provide cheaper electricity for the load compared to only the generator (42). If so, the process causes the storage unit to discharge (44) and updates the UPOE for the storage unit based on the storage cost model (46) and loops back to 22 via connector 1. From 42, if the storage device and the generators in combination cannot provide cheaper electricity than the generators alone, the process supplies the load with the cheapest available generators while keeping the storage unit on standby (50) and the UPOE for the storage unit unchanged (52).

Figure 3:
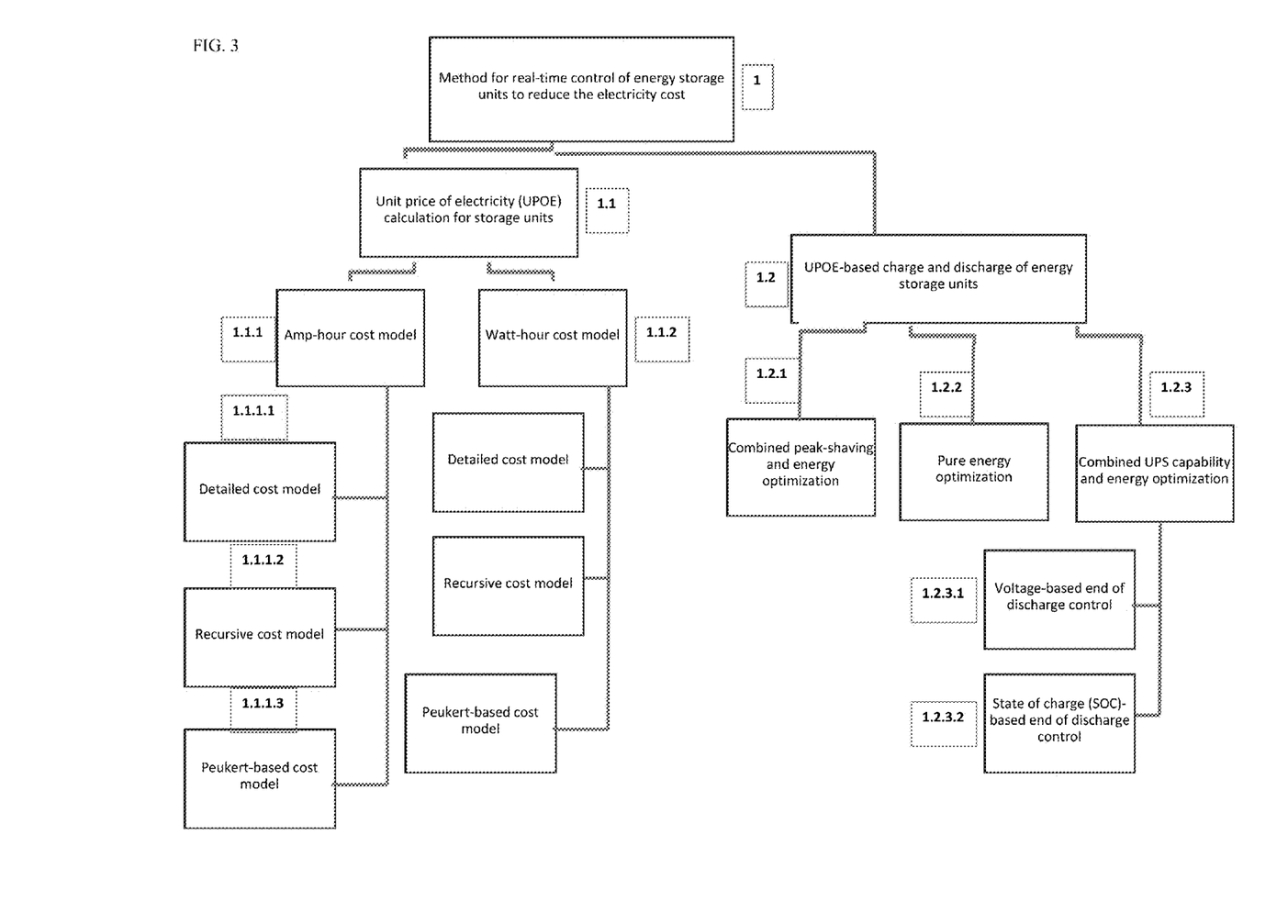
FIG. 3 shows another exemplary process for determining the charging or discharging of the energy device.

FIG. 3 shows another method 1 for real-time control of energy storage unit to reduce the electricity cost: These methods operate storage units in real-time based on the instantaneous values of generation, demand, cost of electricity and other parameters in microgrids. In 1.1, the system performs Unit price of electricity (UPOE) calculation for storage units, including methods to calculate UPOE stored in a storage unit based on the cost of electricity from sources which charged the storage unit and storage characteristics. In 1.1.1, the process can apply an amp-hour cost model—a cost model which relies on charged and discharged Amp-hours in a battery for calculating UPOE. In 1.1.1.1, the process can apply a detailed cost model—a cost model which calculates and keeps track of Amp-hours charged from each charging sources into the storage unit and the cost of electricity from that source during the charging time. In this way, in addition to UPOE from the storage unit, at each instant of time it is clear which percentage of the storage unit is charged from which source. In 1.1.1.1, the process can use a recursive cost model, which only keeps the last values of Amp-hours in the battery and its associated cost. The UPOE is then calculated in a recursive way. This model does not show the individual source contributions but it needs less calculation and memory to obtain UPOE for a storage unit. In 1.1.1.1, the process can alternatively use a Peukert-based cost model. In a Peukert-based cost model, UPOE during charging periods is similar to detailed or recursive cost model. However, during a discharge, UPOE is not constant anymore. According to Peukert's law the capacity of a battery is dependent on its discharge rate. So in this model based on the estimated discharge capacity of a battery, UPOE is adjusted. In this way, high power (current) discharges will be more expensive because at higher discharge rates battery capacity is less. In 1.1.1, a watt-hour cost model can be used. This model is similar to Amp-hour cost model except that charged and discharged watt-hours are used instead of charged and discharged Amp-hours. Similar to the Amp-hour model, watt-hour cost model can also be implemented as a detailed, recursive, or Peukert-based model.

In 1.2, OPOE-based charge and discharge of energy storage units can be used where a real-time control method for storage units in microgrids uses the UPOE of a storage unit as a reference and compares it with UPOE of other sources of electricity in a system (e.g. generators or the grid). In this way the controller can identify the cheapest sources of energy in a microgrid and send commands to them in order to match the electricity supply and demand in the system.

In 1.2.1, the process uses combined peak-shaving and energy optimization: In this control method, the first objective is to shave the peak load. Any extra energy stored in the battery after the peak shaving event will be used for energy optimization according to 1.2. In 1.2.2, pure energy optimization can be used: In this method, all charges and discharges in the battery are UPOE-based as in 1.2. In 1.2.3, the process can provide combined UPS capability and energy optimization. In this method, energy stored in a storage unit is divided into two parts: 1) Energy used for energy optimization (similar to 1.2) 2) UPS application which is only used if a loss of generation occurs in the system. In 1.2.3.1, a voltage-based end of discharge control can be used. In this method, if the battery voltage drops below a certain value the energy optimization application stops to maintain the UPS capability of the storage unit. In 1.2.3.2, the process can use a state of charge (SOC)-based end of discharge control: In this method, if the battery SOC drops below a certain value the energy optimization application stops to maintain the UPS capability of the storage unit.

The UPOE concept for storage units in 1.1 provides a reference price signal for the energy in the storage unit. This reference signal enables the controller to decide in real-time how to operate the storage unit for energy optimization purpose. Different cost models presented in the claim diagram provide different methods based on battery characteristics and the available measurement units in the system to calculate UPOE for the storage units. The process can also apply control methods for combining energy optimization applications with other applications of the energy storage units.

A real-time load management controller can be used in conjunction with the power management units described above. The power management units determine whether it is more cost-effective to use on-site storage unit or to buy the power from the grid to balance the electric supply and demand in case of any power shortage. When the purchase of power from the grid is recommended, the load management controller can decide to drop part of the load during peak grid prices to reduce the utility bill. The main differentiation of the proposed load management technique compared to previous methods is that it decides in real-time if a demand response execution (load shedding) can result in any saving in terms of the utility bill.

In one embodiment, a load management unit in the controller decides when the demand response can be applicable in order to reduce the utility bill. If the power management unit decides to discharge the battery no demand response is necessary. On the other hand, if the power management unit decides to buy the power shortage from the grid then the end-user can dynamically decide to cut its load if the grid price is high. The demand response algorithm can be carried out without the user interaction by specifying the percentage of the load shedding based on the grid price in advance. The proposed demand response algorithm is new and different from the state of the art.

The foregoing presents an intelligent power and load management system for cost-effective real-time operation and control of distributed energy resources (microgrids) including distributed generations, batteries and controllable loads. Special attention is paid to the battery cost model since batteries are the most expensive components of a microgrid. The model to derive the cost of energy from battery (CEB) is based on the number of necessary battery replacements over the micro grid useful lifetime. This cost model is later used for electric power sharing between the battery and the grid as the two controllable sources of electric energy in a microgrid. The new cost model dynamically adjusts the number of battery replacements in a way to keep the cost of energy from the battery comparable to the grid price. This battery cost model is compared with HOMER energy modeling software cost model to show its superior performance.

The load management technique is also presented which complements the power management technique in order to maximize the operational cost saving for the microgrid owner. The load management technique is activated when the power management system decides to import power from the grid. In this way, the overall management system tries to optimally utilize the installed battery in a microgrid before applying load shedding in the system. This new load management system considers impacts of both on-site storage capacity and grid price signal while current demand response programs are only based on the grid price or other signals from the utility.

Figure 4:
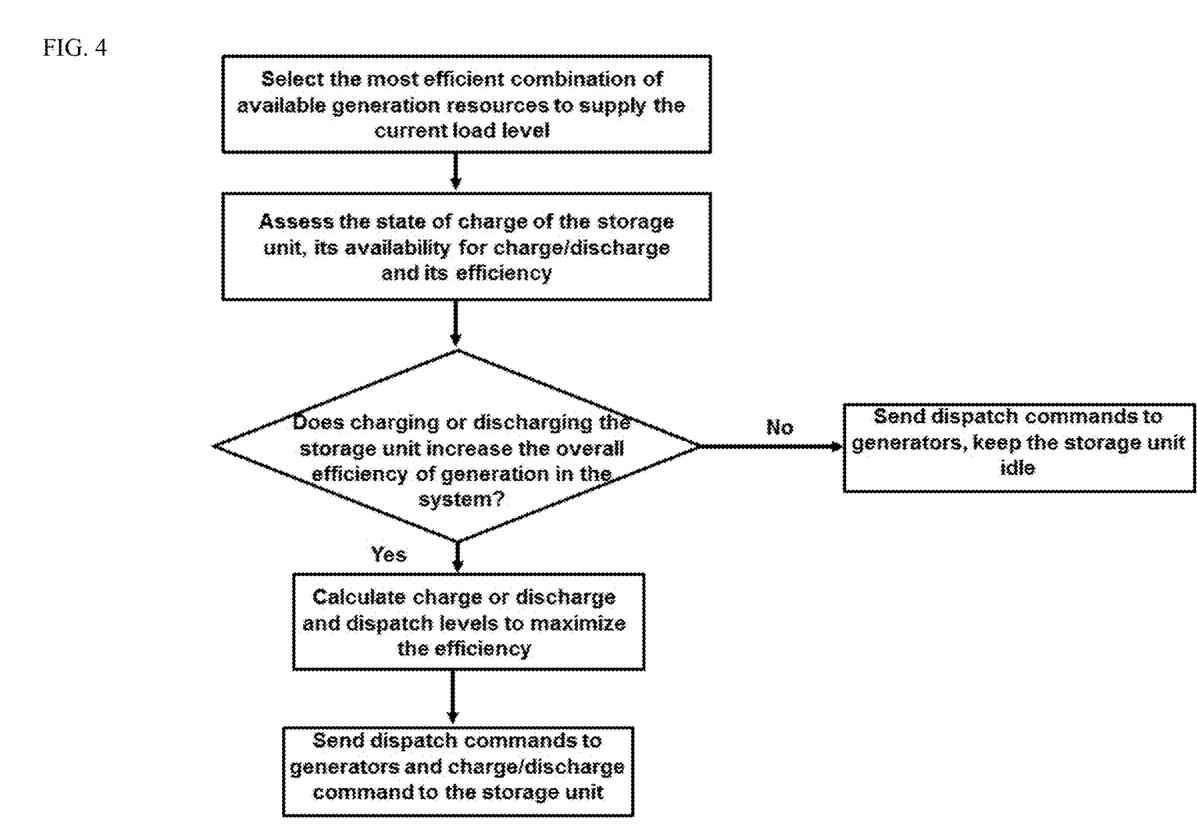
FIG. 4 shows a flow diagram of key steps for efficiency-driven operation of dispatchable sources and storage units in energy systems, in accordance with the invention.

Turning now to FIG. 4, there is shown a flow diagram of key steps for efficiency-driven operation of dispatchable sources and storage units in energy systems. Initially, the invention selects the most efficient combination of available generation resources to supply the current load level. The invention then assesses the state of charge of the storage unit, its availability for charge/discharge and its efficiency. The invention checks if charging or discharging the storage unit increases the overall efficiency of generation in the system? If not, the invention sends dispatch commands to generators and keeps the storage unit idle. If yes, the invention calculates the charge or discharge and dispatch levels to maximize the efficiency. The invention then sends dispatch commands to generators and charge/discharge command to the storage unit.

Figure 5:
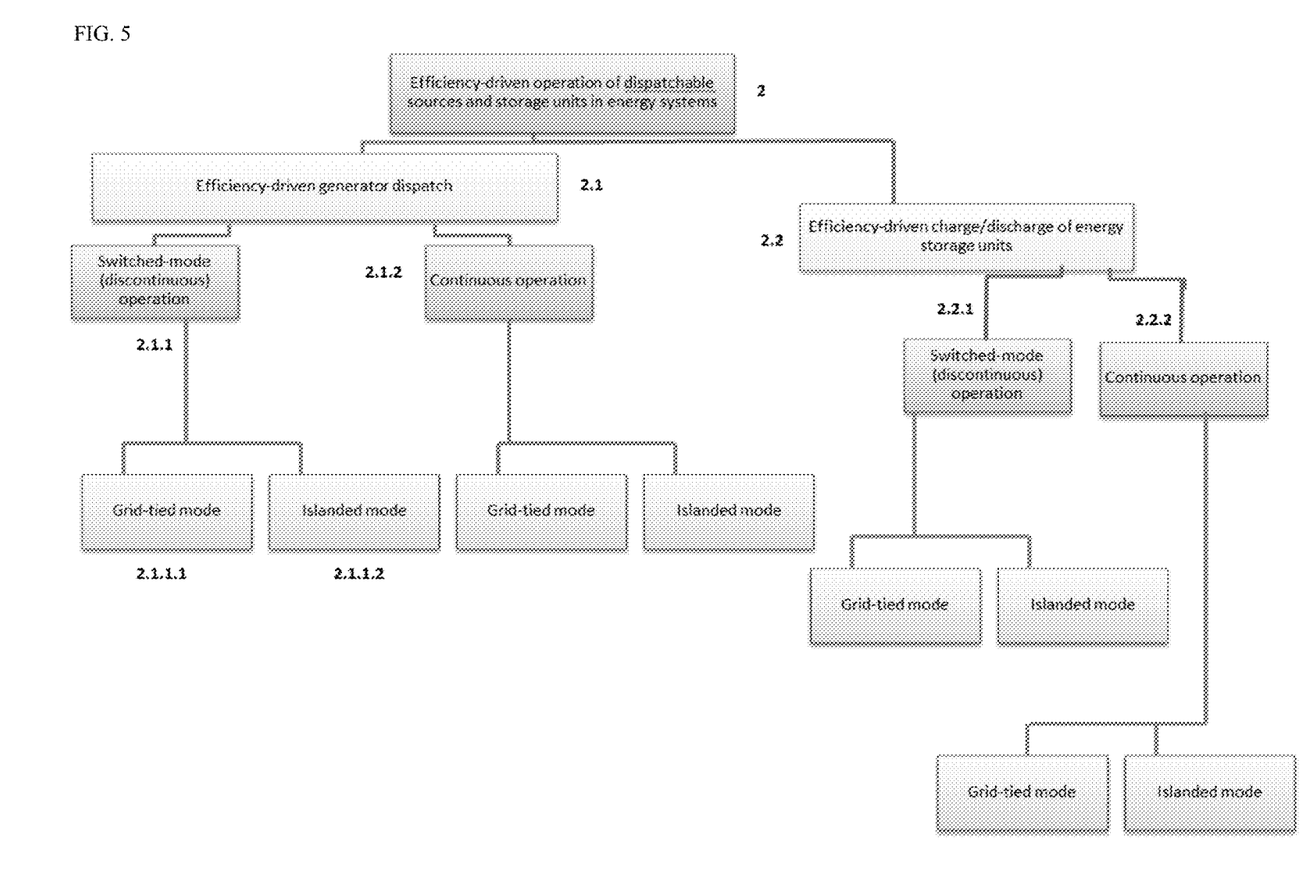
FIG. 5 shows an exemplary process for efficiency-driven operation of dispatchable sources and storage units in energy systems, in accordance with the invention.

Turning now to FIG. 5, there is shown an exemplary process for efficiency-driven operation of dispatchable sources and storage units in energy systems. The inventive aspects are components 2 efficiency driven operation of dispatchable sources and storage units in energy systems, 2.1 Efficiency-driven generator dispatch; 2.11 switched-mode (discontinuous operation); 2.1.2 continuous operation; 2.1.1.1 grid-tied mode; 2.1.1.2 islanded mode; 2.2 efficiency driven charge/discharge of energy storage units; 2.2.1 switched mode (discontinuous operation), 2.2.2 continuous operation.

2: The Efficiency-driven operation of dispatchable sources and storage units in energy systems: Energy management (EM) methods which intend to increase the overall efficiency of generation in energy systems.

2.1: The Efficiency-driven generator dispatch: An energy management EM method which dispatches generators based on their efficiency characteristics.

2.1.1: Switched-mode (discontinuous) operation: In this method, EM dispatches generators with higher overall efficiencies first.

2.1.1.1: Grid-tied mode: This method refers to applications where energy system is connected to the gird but local generators and/or energy storage units must operate due to some restrictions on the amount of imported power from the grid.

2.1.1.2: Islanded mode: This method refers to applications where the energy system is not connected to the grid and local generators and/or energy storage units are responsible for supplying the entire load in the system.

2.1.2: Continuous operation: In this method, EM shares the total load among different generators in a way so that each generator operates close to its optimal efficiency point.

2.2: Efficiency-driven charge/discharge of energy storage units: EM methods which utilize energy storage units to increase the overall efficiency of generation in energy systems.

2.2.1: Switched-mode (discontinuous) operation: In this method, energy storage unit charges and discharges in a way to either make generators operate at their optimal efficiency operational point or not to operate at all.

2.2.2: Continuous operation: In this method energy storage unit charges and discharges in a way to keep generator running close to their optimal efficiency operational point all the time.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 6:
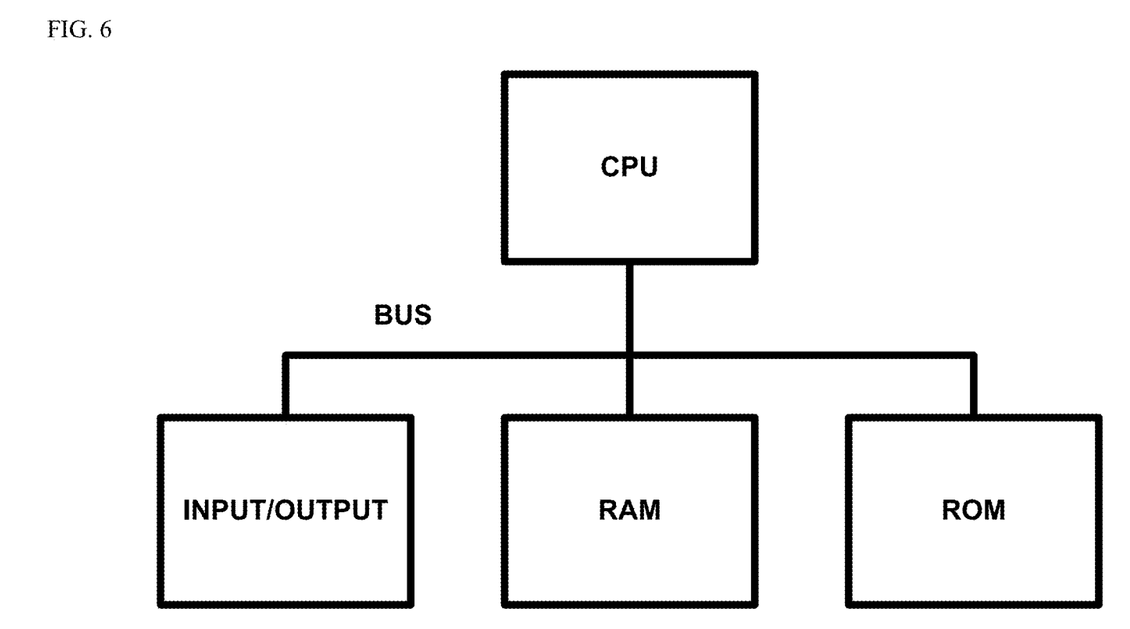
FIG. 6 shows an exemplary computer system for managing efficiency-driven operation of dispatchable sources and storage units in energy systems

By way of example, a block diagram, shown in FIG. 6, of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for managing an efficiency-driven operation of dispatchable generator sources and storage units in energy systems, comprising:

selecting an efficient combination of available energy resources in an energy system to supply a current load level;

assessing a storage unit's state of charge of a storage unit, availability for charge or discharge operation and efficiency;

sending dispatch commands to generator sources and keeping the storage unit idle if charging or discharging the storage unit does not increase an overall efficiency of generation in the energy system;

calculating charge or discharge of the storage unit and dispatching levels to maximize efficiency of the storage unit if charging or discharging the storage unit increases an overall efficiency of generation in the energy system;

sending dispatch commands to the generator sources and charge or discharge commands to the storage unit for efficiency-driven operation of dispatchable generators and storage units in the energy system; and charging with a unit price of electricity (UPOE) determined at time step k when the generator sources 1 . . . n are charging the storage unit as $$UPOE(k) = \frac{x_1(k) \times y_1(k) + x_2(k) \times y_2(k) + \ldots + x_n(k) \times}{x_1(k) + x_2(k) + \ldots + x_n(k)}$$

where $x_1(k)$ represents the total stored amp-hour in the storage unit from generator sources 1 at time k and during discharging, $x_1$ to $x_n$ decreases with the same proportion.

2. The method of claim 1, wherein sending dispatch commands to the generators comprises a switched-mode, discontinuous operation wherein generators with higher overall efficiencies being dispatched first.

3. The method of claim 1, wherein sending dispatch commands to the generators comprises continuous operation wherein total load among different generators is shared in a way so that each generator operates close to its optimal efficiency point.

4. The method of claim 1, wherein charge or discharge of the storage unit comprises a switched mode, discontinuous operation wherein the energy storage unit charges and discharges in a way to either make generators operate at their optimal efficiency operational point or not to operate at all.

5. The method of claim 1, wherein charge or discharge of the storage unit comprises a continuous operation wherein the energy storage unit charges and discharges in a way to keep the generators running close to their optimal efficiency operational point all the time.

6. The method of claim 1, wherein the generator dispatch comprises a grid-tied mode of operation where the energy system is connected to a grid in the energy system but local generators and/or energy storage units must operate due to some restrictions o the amount of imported power from the grid.

7. The method of claim 1, wherein the generator dispatch commands comprises an islanded mode of operation where the energy system is not connected to a grid and local generators and/or energy storage units are responsible for supplying an entire load in the energy system.

8. The method of claim 1, wherein the charge or discharge of the storage unit comprises a grid-tied mode of operation where the energy system is connected to a grid in the energy system but local generators and/or energy storage units must operate due to some restrictions o the amount of imported power from the grid.

9. The method of claim 1, wherein the charge or discharge of the storage unit comprises an islanded mode of operation where the energy system is not connected to a grid and local generators and/or energy storage units are responsible for supplying an entire load in the energy system.

10. A management system for an energy system for managing an efficiency-driven operation of dispatchable generator sources and storage units in energy systems, the management system comprising a computer system configured for carrying out the following steps:
 selecting an efficient combination of available energy resources in an energy system to supply a current load level;
 assessing a storage unit's state of charge of a storage unit, availability for charge or discharge operation and efficiency;
 sending dispatch commands to generators and keeping the storage unit idle if charging or discharging the storage unit does not increase an overall efficiency of generation in the energy system;
 calculating charge or discharge of the storage unit and dispatching levels to maximize efficiency of the storage unit if charging or discharging the storage unit increases an overall efficiency of generation in the energy system; and
 sending dispatch commands to the generators and charge or discharge commands to the storage unit for efficiency-driven operation of dispatchable generators and storage units in the energy system; and
 charging with a unit price of electricity (UPOE) determined at time step k when sources 1 . . . n are charging the storage unit as $$UPOE(k) = \frac{x_1(k) \times y_1(k) + x_2(k) \times y_2(k) + \ldots + x_n(k) \times}{x_1(k) + x_2(k) + \ldots + x_n(k)}$$

where $x_1(k)$ represents the total stored amp-hour in the storage unit from source 1 at time k and during discharging, $x_1$ to $x_n$ decreases with the same proportion.

11. The method of claim 10, wherein sending dispatch commands to the generators comprises a switched-mode, discontinuous operation wherein generators with higher overall efficiencies being dispatched first.

12. The method of claim 10, wherein sending dispatch commands to the generators comprises continuous operation wherein total load among different generators is shared in a way so that each generator operates close to its optimal efficiency point.

13. The method of claim 10, wherein charge or discharge of the storage unit comprises a switched mode, discontinuous operation wherein the energy storage unit charges and discharges in a way to either make generators operate at their optimal efficiency operational point or not operate at all.

14. The method of claim 10, wherein charge or discharge of the storage unit comprises a continuous operation wherein the energy storage unit charges and discharges in a way to keep the generators running close to their optimal efficiency operational point all the time.

15. The method of claim 10, wherein the generator dispatch comprises a grid-tied mode of operation where the energy system is connected to a grid in the energy system but local generators and/or energy storage units must operate due to some restrictions o the amount of imported power from the grid.

16. The method of claim 10, wherein the generator dispatch commands comprises an islanded mode of operation where the energy system is not connected to a grid and local generators and/or energy storage units are responsible for supplying an entire load in the energy system.

17. The method of claim 10, wherein the charge or discharge of the storage unit comprises a grid-tied mode of operation where the energy system is connected to a grid in the energy system but local generators and/or energy storage units must operate due to some restrictions o the amount of imported power from the grid.

18. The method of claim 10, wherein the charge or discharge of the storage unit comprises an islanded mode of operation where the energy system is not connected to a grid and local generators and/or energy storage units are responsible for supplying an entire load in the energy system.

* * * * *